(12) United States Patent
Wang

(10) Patent No.: US 6,915,999 B2
(45) Date of Patent: Jul. 12, 2005

(54) CONNECTION MEMBER FOR CONNECTING BICYCLE RACK AND EXTENTION TUBE CONNECTED TO VEHICLES

(76) Inventor: Chiu Kuei Wang, No. 101-19, Chung-Cheng Li, Yuanli, Miaoli Hsien (TW)

( * ) Notice: Subject to any disclaimer, the term of this patent is extended or adjusted under 35 U.S.C. 154(b) by 30 days.

(21) Appl. No.: 10/600,464

(22) Filed: Jun. 23, 2003

(65) Prior Publication Data

US 2004/0258465 A1 Dec. 23, 2004

(51) Int. Cl.⁷ .............................................. A01K 97/10
(52) U.S. Cl. ...................................... 248/534; 403/345
(58) Field of Search ........................... 403/345; 248/334

(56) References Cited

U.S. PATENT DOCUMENTS

2002/0008364 A1 * 1/2002 Kahlstorf .................... 280/515
2003/0071185 A1 * 4/2003 Casapulla ................... 248/534
2003/0102343 A1 * 6/2003 Anderson et al. .......... 224/536

* cited by examiner

Primary Examiner—John R. Cottingham
(74) Attorney, Agent, or Firm—Rosenberg, Klein & Lee

(57) ABSTRACT

A connection member is connected to a bicycle rack at an engaging plate on a top of the connection member and a through hole is defined through the connection member. A polygonal wall extends from a side of the connection member and encloses the through hole. A rectangular extension tube is connected to a vehicle and is inserted through the through hole. Bolts extend through the polygonal wall and are engaged with the extension tube.

2 Claims, 7 Drawing Sheets

CONNECTION MEMBER FOR CONNECTING BICYCLE RACK AND EXTENTION TUBE CONNECTED TO VEHICLES

FIELD OF THE INVENTION

The present invention relates to a connection member for being connected with a bicycle rack and the connection member has a through hole enclosed by a polygonal wall. The extension tube extends through the through hole and is fixed by the polygonal wall.

BACKGROUND OF THE INVENTION

As shown in FIG. 6, a conventional bicycle rack 50 is connected to a connection member 43 which is fixed to an extension tube 41 connected with a connection sphere 421 on a frame 42. The extension tube 41 is fixed to a rear end of the vehicle and the connection member 43 has two lugs 431 extending from an underside thereof. The extension tube 41 is located between the two lugs 431 and a bolt 432 extends through the lugs 431 and through the extension tube 41. Nevertheless, the connection member 43 tends to shake during riding of the vehicle and the shaking is transferred to the bicycle rack and the bicycles on the rack. This results a severe shear force on the bolt 432 which could be broken within a short period of time.

The present invention intends to provide a connection member that can be fixedly connected to the extension tube so as to prevent the shaking of the bicycle rack.

SUMMARY OF THE INVENTION

In accordance with one aspect of the present invention, there is provided n assembly for connecting a connection member and an extension tube. The connection member is connected to a bicycle rack and the extension tube is connected to a vehicle. The connection member has a through hole which is enclosed by a polygonal wall extending from a side of the connection member. The extension tube is inserted through the through hole. The polygonal wall has at least one hole defined therethrough and the extension tube has at least one threaded hole. A bolt extends through the at least one hole and is engaged with the at least one threaded hole.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
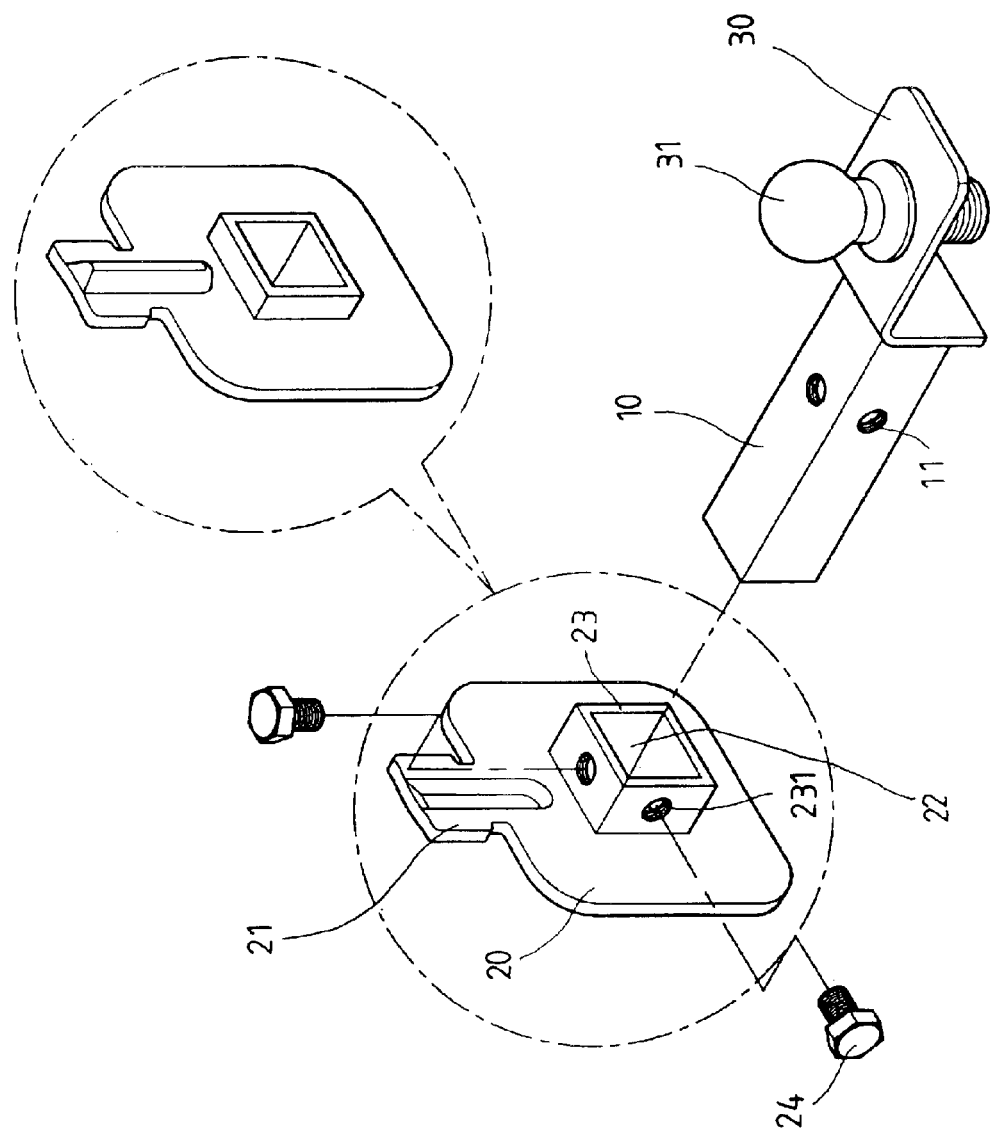
FIG. 1 is an exploded view to show the connection member and the extension tube of the present invention.
Figure 2:
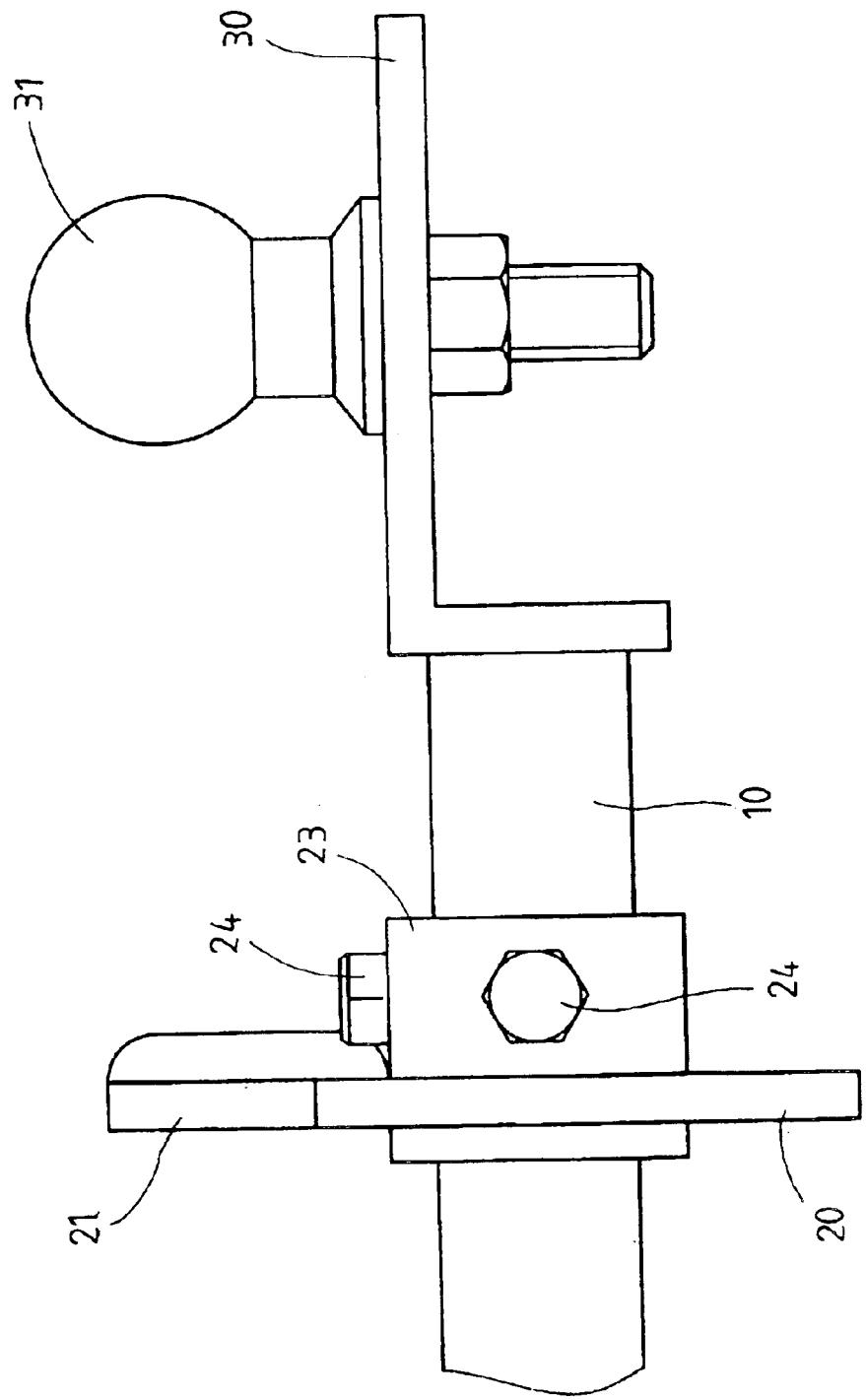
FIG. 2 is a side view to show the connection of the connection member and the extension tube of the present invention.
Figure 3A:
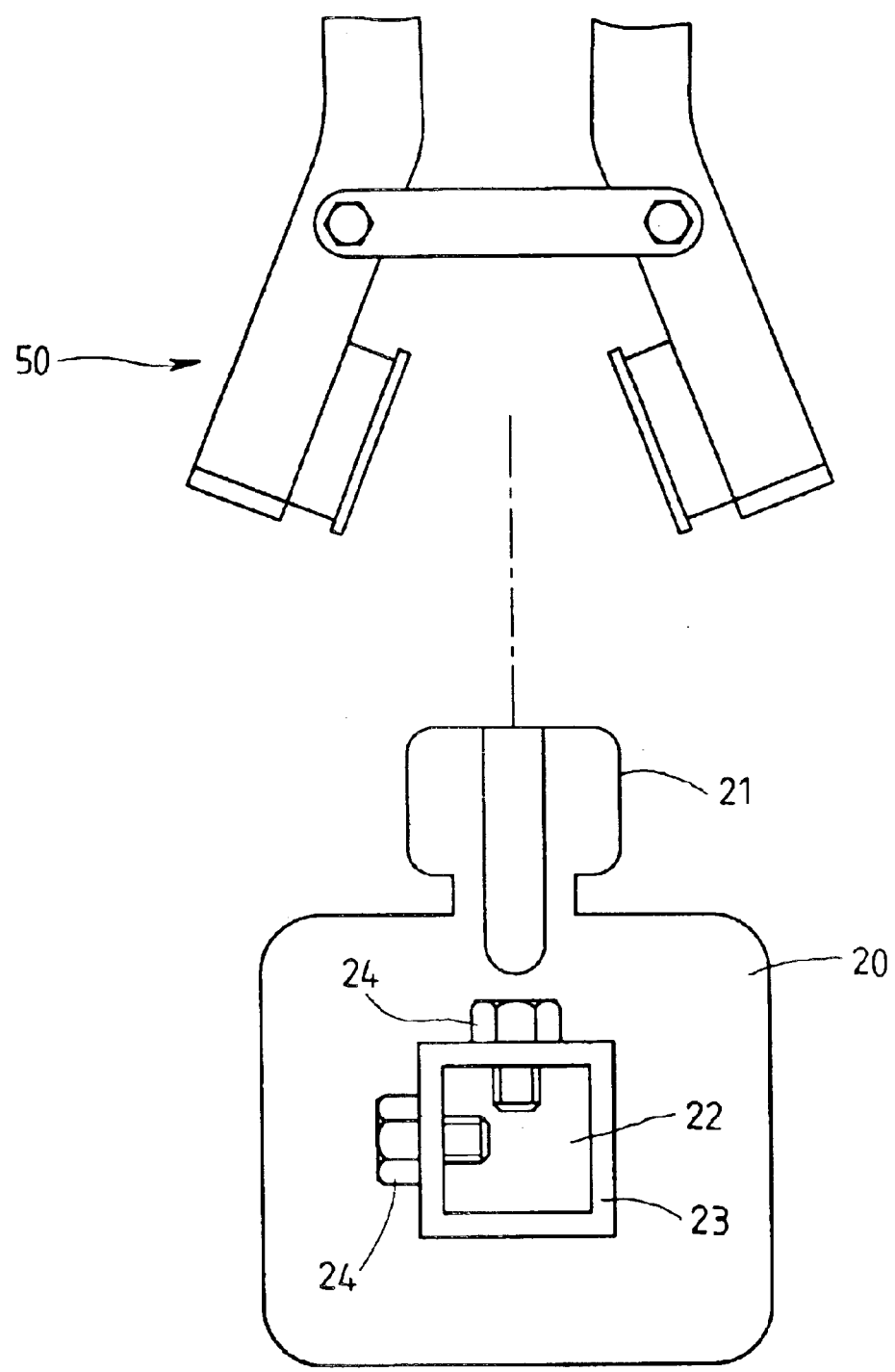
FIG. 3A shows that the bicycle rack is to be connected on an engaging plate on the connection member.
Figure 3B:
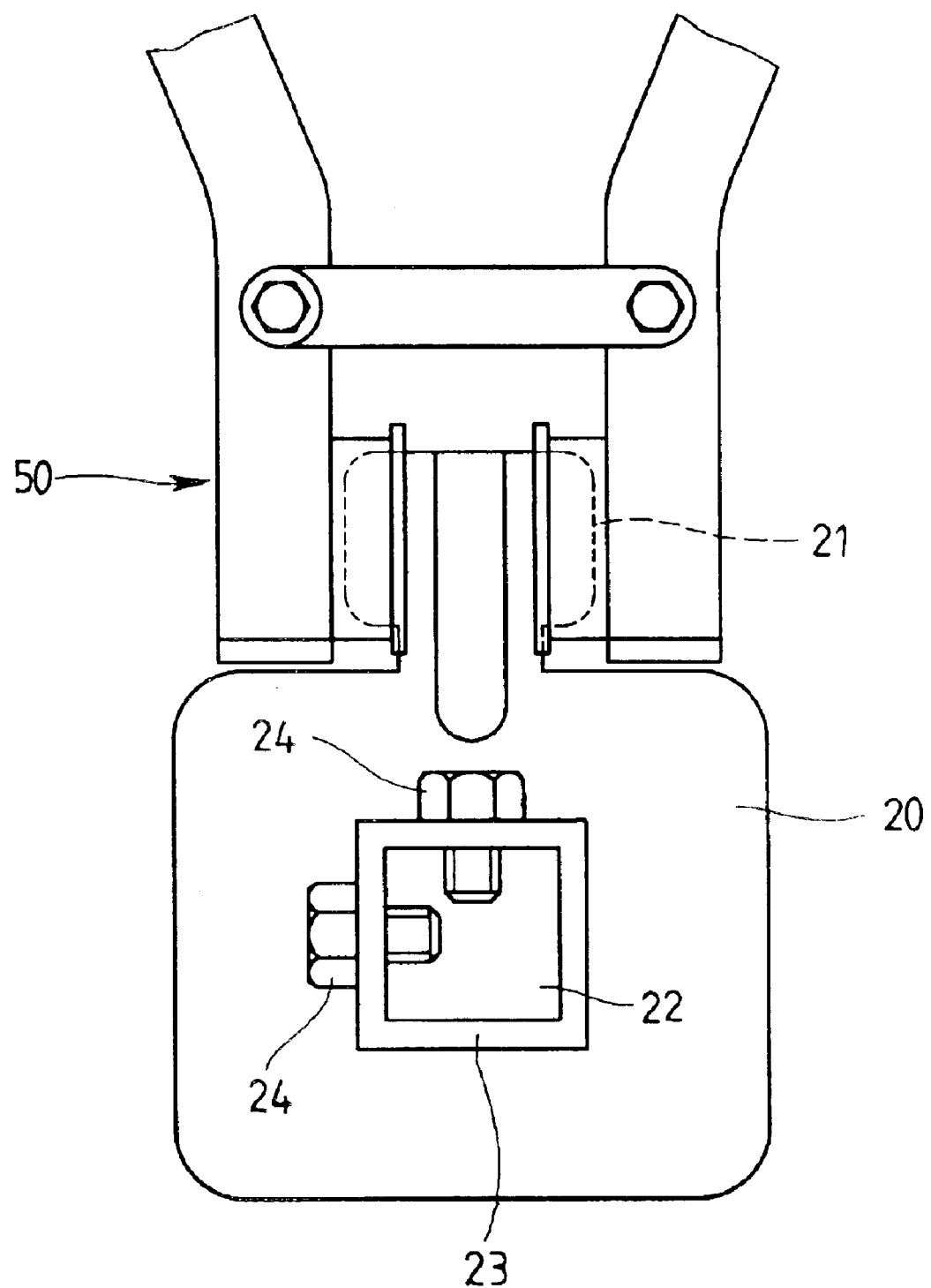
FIG. 3B shows that the bicycle rack is connected on an engaging plate on the connection member.
Figure 4:
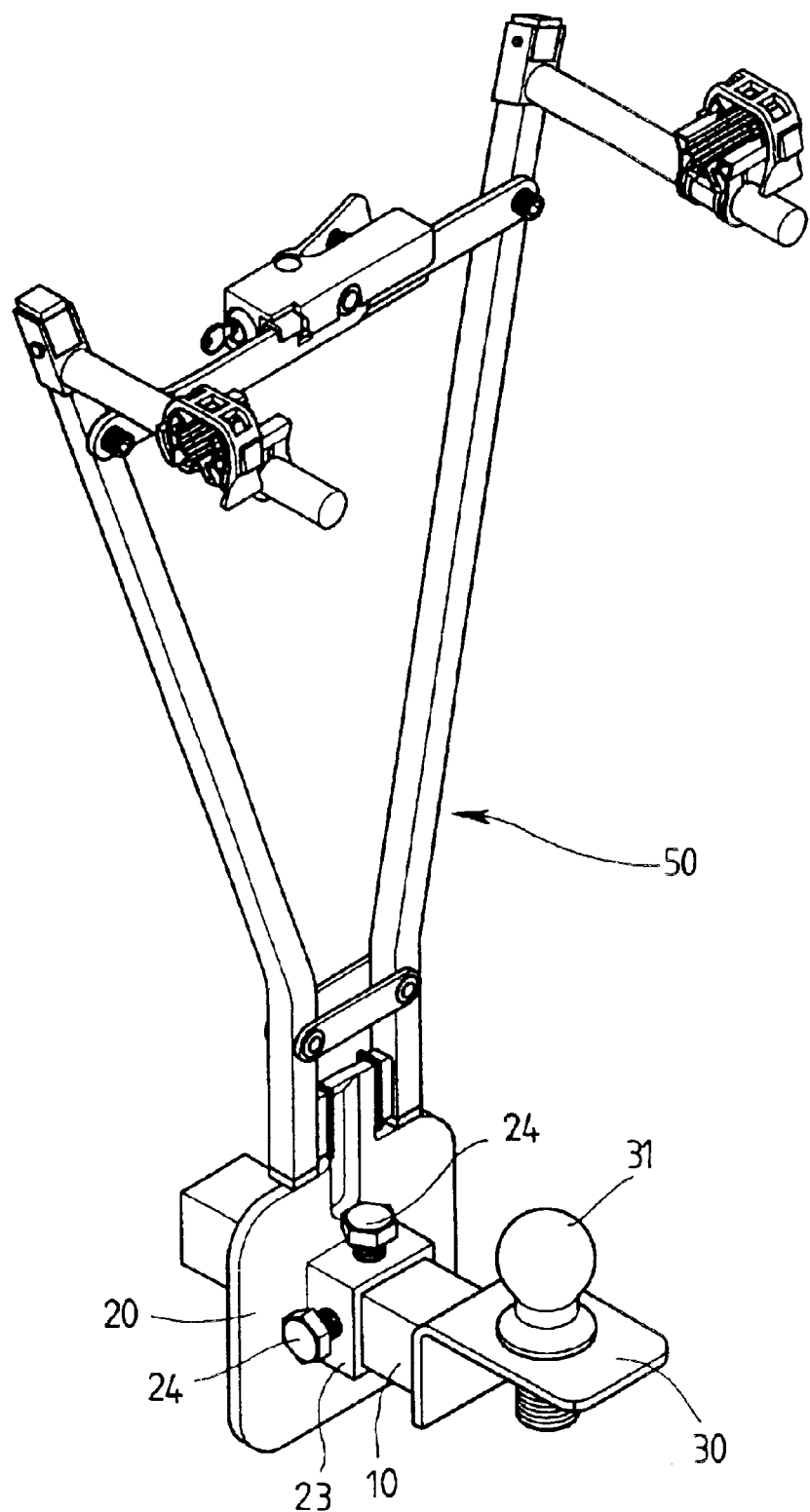
FIG. 4 is a perspective view to show assembly of the bicycle rack, the connection plate and the extension tube of the present invention.
Figure 5:
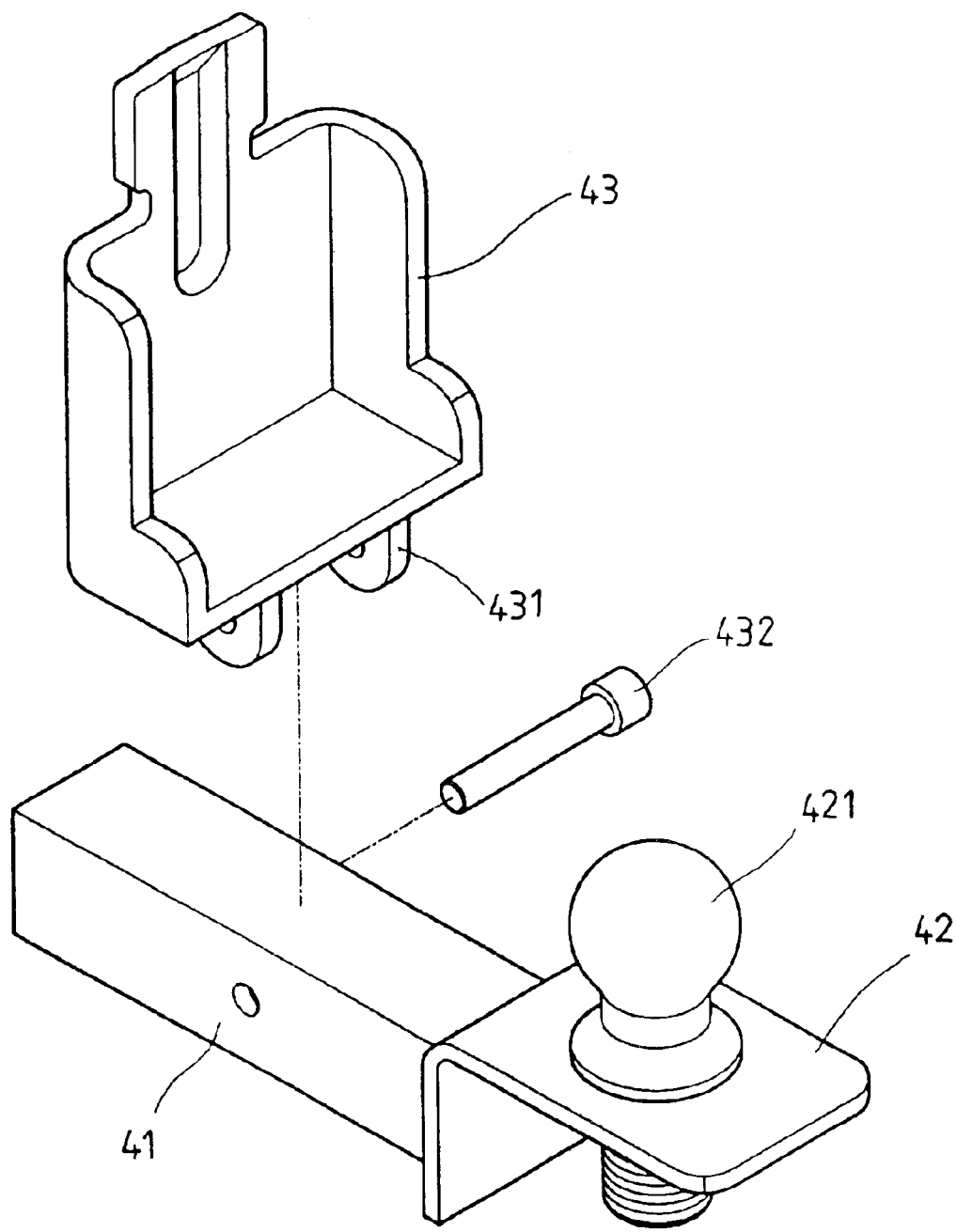
FIG. 5 is an exploded view to show a conventional connection plate and an extension tube.
Figure 6:
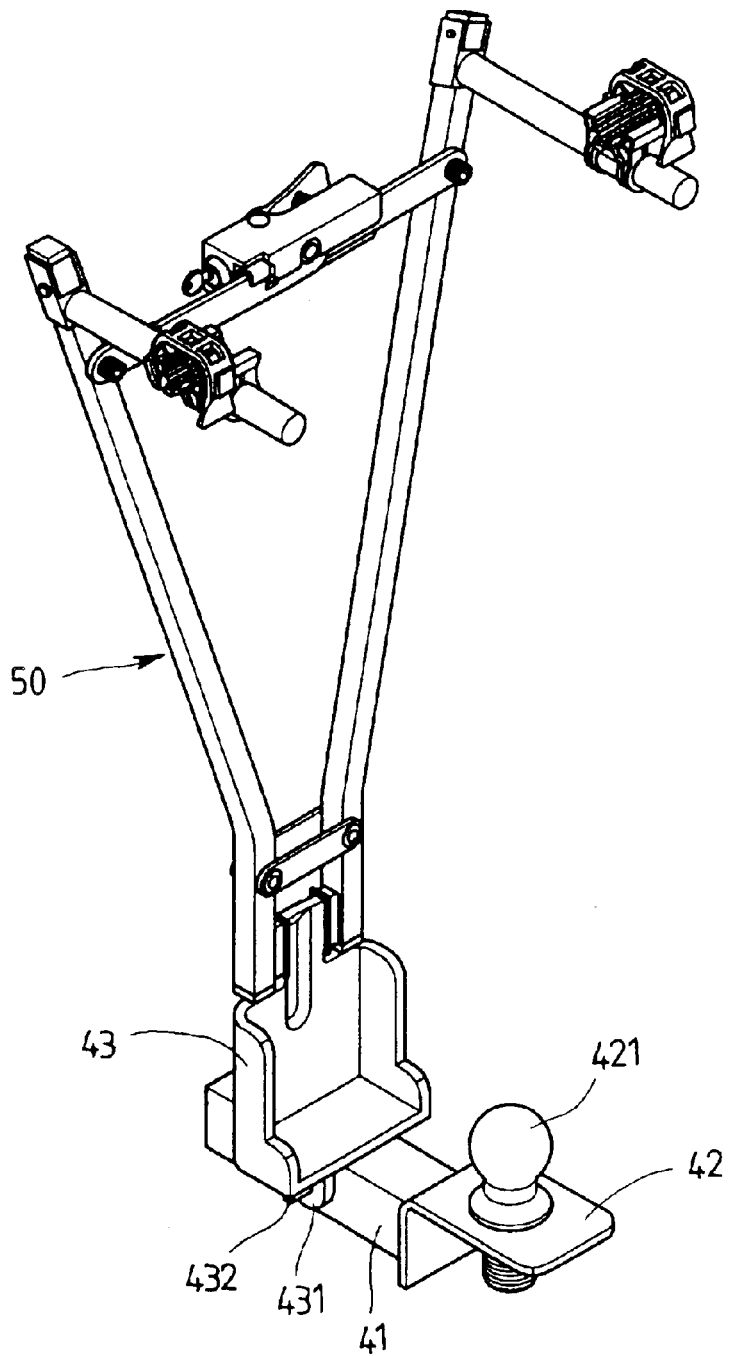
FIG. 6 is a perspective view to show assembly of the bicycle rack, the conventional connection plate and the extension tube.

Referring to FIGS. 1, 2 and 4, the connection member 20 of the present invention comprises a through hole 22 defined therethrough which is enclosed by a polygonal wall 23 extends from a side of the connection member 20. The polygonal wall 23 has two holes 231 defined in two sides of the polygonal wall 23. An engaging plate 21 is extended from a top of the connection member 20 so that a bicycle rack 50 is connected to the engaging plate 21.

A rectangular extension tube 10 is connected to a frame 30 and a connection sphere 31 is connected to the frame 30. The extension tube 10 is connected to a rear end of a vehicle (not shown) and inserted through the through hole 22. The extension tube 10 has two threaded holes 11 in two sides thereof so that two bolts 24 extend through the holes 231 and are engaged with the threaded holes 11. By this arrangement, the connection member 20 is firmly connected to the extension tube 10.

The extension tube 10 is enclosed by the polygonal wall 23 and two bolts 24 are used to connect the extension tube 10 and the polygonal wall 23 in two directions so that the connection member 20 is prevented from shaking during riding of the vehicle.

While we have shown and described the embodiment in accordance with the present invention, it should be clear to those skilled in the art that further embodiments may be made without departing from the scope of the present invention.

What is claimed is:

1. An assembly for connecting a connection member and an extension tube, the connection member connected to a bicycle rack and the extension tube connected to a vehicle, wherein the connection member has an engaging plate extending from a top thereof so as to be connected to the bicycle rack, a through hole is defined through the connection member and a polygonal wall extends from a side of the connection member and encloses the through hole, the extension tube is inserted through the through hole, the polygonal wall has two holes defined through two sides thereof and the two holes being oriented in two different directions, the extension tube has two threaded holes, two bolts extend through the two holes and are engaged with the two threaded holes.

2. The assembly as claimed in claim 1, wherein the two holes in the two sides of the polygonal wall are oriented to be perpendicular to each other.

* * * * *